(12) United States Patent
Goodell

(10) Patent No.: US 7,334,847 B2
(45) Date of Patent: Feb. 26, 2008

(54) SINGLE LINE REMOTE PURGE AIR DRYER

(75) Inventor: David J. Goodell, Beaverton, OR (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 0 days.

(21) Appl. No.: 10/682,218

(22) Filed: Oct. 9, 2003

(65) Prior Publication Data

US 2005/0077779 A1    Apr. 14, 2005

(51) Int. Cl.
B60T 11/34    (2006.01)
(52) U.S. Cl. .................. 303/85; 220/500; 137/576
(58) Field of Classification Search ............ 96/113, 96/136, 144, 147; 220/553, 500, 501, 502; 95/121; 55/DIG. 17; 303/1, 85; 137/576; 34/81, 69, 218
See application file for complete search history.

(56) References Cited

U.S. PATENT DOCUMENTS

| | | | | |
|---|---|---|---|---|
| 4,655,801 A | * | 4/1987 | Kojima et al. | 96/137 |
| 4,892,569 A | * | 1/1990 | Kojima | 96/113 |
| 5,458,677 A | * | 10/1995 | VanderMolen | 96/113 |
| 5,575,541 A | * | 11/1996 | Elamin | 303/1 |
| 5,917,139 A | * | 6/1999 | Goodell et al. | 96/113 |
| 6,074,462 A | * | 6/2000 | Quinn et al. | 96/113 |
| 6,391,098 B1 | * | 5/2002 | Thomas | 96/111 |
| 6,585,806 B2 | * | 7/2003 | Quinn et al. | 95/121 |
| 6,601,926 B2 | * | 8/2003 | Tevis | 303/85 |
| 6,743,277 B2 | * | 6/2004 | Goodell et al. | 95/19 |
| 6,785,980 B1 | * | 9/2004 | Koelzer | 34/81 |
| 2002/0189456 A1 | | 12/2002 | Hoffman | |
| 2004/0045436 A1 | | 3/2004 | Quinn et al. | |

OTHER PUBLICATIONS

Drawing of a prior art North American Type Remote Purge Reservoir Solution (1 Sheet).
Drawing of a prior art European Type Remote Purge Reservoir Solution (1 Sheet).

* cited by examiner

Primary Examiner—Bradley King
(74) Attorney, Agent, or Firm—Calfee, Halter & Griswold LLP

(57) ABSTRACT

An air supply system for a vehicle air braking system includes an air dryer and a reservoir assembly including a downstream section and a purge reservoir. The downstream section may be a supply or service reservoir or a multi circuit pressure protection valve. A passage extends through the purge reservoir between the air dryer and the downstream section. A delivery valve is in the passage. A purge passageway is on the reservoir assembly between the air dryer and the delivery valve and in fluid communication with the passage. In one embodiment, the reservoir assembly is remote from the air dryer, and only one air line connects the air dryer and the reservoir assembly.

12 Claims, 7 Drawing Sheets

US 7,334,847 B2

SINGLE LINE REMOTE PURGE AIR DRYER

TECHNICAL FIELD

The present invention relates to an air supply system for a vehicle. In particular, the present invention relates to an air supply system for a vehicle air braking system, including an air dryer and a purge mechanism for the air dryer.

BACKGROUND OF THE INVENTION

A typical vehicle air braking system includes an air compressor for supplying compressed air to the vehicle brakes. Compressed air from the compressor is directed through an air dryer to remove moisture and other impurities, then is stored in one or more supply or service reservoirs. When the vehicle brakes are actuated, compressed air is drawn from the supply or service reservoir to power the brakes.

The compressor operates on a cut-in and cut-out cycle. The compressor cuts in, that is, is actuated, when the pressure in the supply or service reservoir drops to a predetermined value, for example, 100 psi. When the pressure in the supply or service reservoir thereafter increases to a second predetermined level, for example, 130 psi, the compressor cuts out.

The air dryer is a desiccant which acts as a filter, removing and storing impurities, such as water, from the compressed air. When the compressor cuts out (is "unloaded"), a purge mechanism may be actuated to clean the air dryer of impurities it has collected. The purge mechanism includes a purge volume, which is a volume of compressed air that is preferably very clean, stored in a purge reservoir. The purge mechanism also includes a purge valve. To purge the air dryer, the purge valve is opened. When the purge valve is opened, the stored compressed air in the purge reservoir is enabled to flow, at a low pressure, through the air dryer, in a backflow manner. The backflow of clean, low pressure, air through the air dryer cleans, or purges, the impurities from the air dryer. The desiccant is regenerated. When this purge cycle is complete, the purge valve is closed, and the system returns to its previous operational state.

The purge reservoir is sometimes a second reservoir that is separate and distinct from the supply or service reservoir. The purge reservoir may, alternatively, be a portion of the supply or service reservoir that is kept separate by baffles in the reservoir. In either case, two fluid flow lines are provided from the air dryer, one for directing high pressure air to the supply or service reservoir, and one for directing high pressure air to and low pressure air from the purge reservoir to the air dryer.

SUMMARY OF THE INVENTION

The present invention relates to an air supply system for a vehicle air braking system. The air supply system includes an air dryer, and a reservoir assembly that includes a purge reservoir and a downstream section such as a supply or service reservoir or a multi circuit pressure protection valve. A passage extends through the purge reservoir between the air dryer and the downstream section. A delivery valve is in the passage. A purge passageway is on the reservoir assembly between the air dryer and the delivery valve and in fluid communication with the passage.

In one embodiment, the reservoir assembly is remote from the air dryer, and only one air line connects the air dryer in fluid communication with the reservoir assembly. The purge passageway is between the one air line and the delivery valve.

In another embodiment, the reservoir assembly is mounted on the air dryer. The purge reservoir is located between the downstream section and the air dryer, and the passage extends from the air dryer through an outer wall of the purge reservoir and to the downstream section.

The reservoir assembly may be remote from the air dryer and connected by only one air line, or may be mounted on the air dryer.

The present invention also relates to an air supply system for a vehicle air braking system, that comprises an air dryer, a compressor having an output, and a purge valve connected between the compressor and the air dryer. The purge valve has a first condition in which the output of the compressor is connected with the air dryer to direct compressed air into the air dryer. A downstream section of a reservoir assembly is located remote from the air dryer. Only one air line connects the air dryer and the downstream section. A delivery valve on the reservoir assembly enables flow of compressed air from the air dryer through the one air line to the downstream section and blocks flow of air from the downstream section through the one air line to the air dryer. A purge reservoir is on the reservoir assembly. A purge passageway connects the purge reservoir in fluid communication with the one air line. The purge passageway is located between the air dryer and the delivery valve.

BRIEF DESCRIPTION OF THE DRAWINGS

The foregoing and other features of the present invention will become apparent to one skilled in the art to which the present invention relates upon consideration of the following description of the invention with reference to the accompanying drawings, in which.

DETAILED DESCRIPTION

Figure 1:
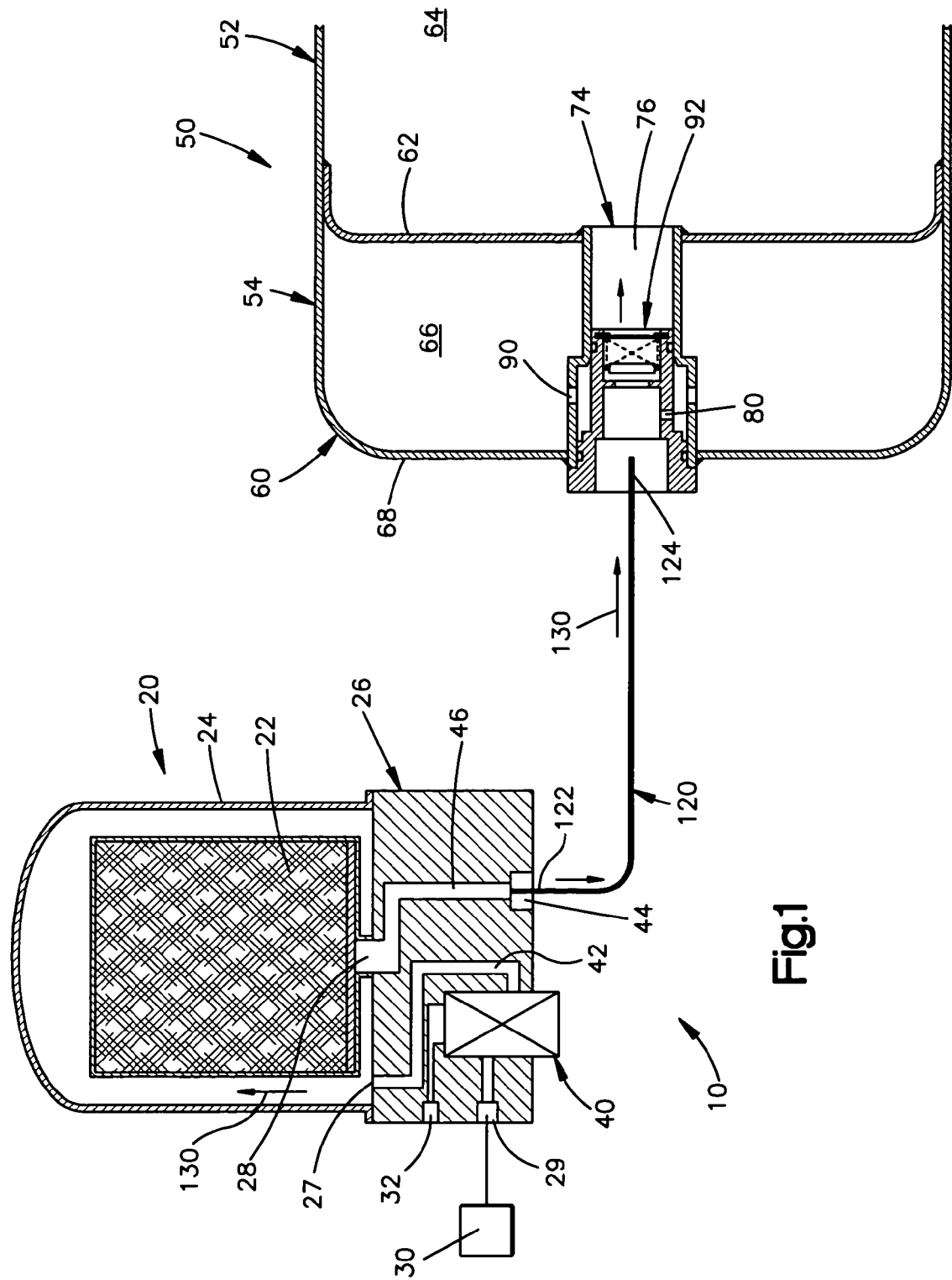
FIG. 1 is a schematic view of a vehicle air supply system constructed in accordance with a first embodiment of the invention, showing fluid flow directions during a charge cycle.

The present invention relates to an air supply system for a vehicle. In particular, the present invention relates to an air supply system for a vehicle air braking system, including an air dryer and a purge mechanism for the air dryer. The present invention is applicable to air supply systems of differing constructions. As representative of the present invention, FIG. 1 illustrates a portion of an air supply system 10 in accordance with a first embodiment of the invention.

The air supply system 10 includes an air dryer 20. The air dryer 20 includes a desiccant cartridge 22 located in a cover or shell 24. The shell 24 and the desiccant cartridge 22 are mounted on a base 26. The shell 24 is removable from the base 26 to enable replacement of the desiccant cartridge 22. The cartridge 22 has an inlet 27 and an outlet 28.

The base 26 includes a supply port 29. The supply port 29 is connected with a compressor 30. The base 26 also includes a control port 32. The control port 32 is connected with a suitable control, such as a fluid pressure inlet line (not shown).

A purge valve 40 is mounted on the base 26. The purge valve 40 is operable in a known manner, under the control of fluid pressure at the control port 32, to control air flow from the supply port 29 into the cartridge inlet 27.

The supply port 29 and the control port 32 both are connected internally of the base 26 with the purge valve 40. The base 26 includes a first internal flow line 42 between the purge valve 40 and the cartridge 22. The base 26 also includes a delivery port 44 for delivering (supplying) dried compressed air to the vehicle braking system. A second internal flow line 46 in the base 26 extends between the cartridge outlet 28 and the delivery port 44.

The air supply system 10 includes a reservoir assembly 50. The reservoir assembly 50 in the embodiment of FIG. 1 is located remote from the air dryer 20; that is, it is spaced apart from (not mounted on) the air dryer or the base 26, so that at least one air line is needed to direct air between the reservoir assembly and the air dryer. The reservoir assembly 50 includes a purge reservoir 54 and a downstream section 52. In the embodiment shown in FIG. 1, the downstream section 52 is a supply or service reservoir. In the embodiments shown in FIGS. 6 and 7, the downstream section 52 is a multi circuit pressure protection valve.

A reservoir assembly 50 in accordance with the present invention may take differing forms. For example, a reservoir assembly 50 may include two or more separate tanks, for a supply or service reservoir 52 and the purge reservoir 54 and/or one or more service reservoirs, that are physically joined together. Alternatively, a reservoir assembly 50 may include one tank having baffles or another form of separation so as to provide two or more chambers in one tank. Still further, the downstream section of the reservoir assembly may include a pressure protection valve, as described below with reference to FIGS. 6 and 7.

As illustrated schematically in FIG. 1, the reservoir assembly 50 includes one tank 60 having an internal baffle or divider 62 to form the supply or service reservoir 52 and the purge reservoir 54 in the tank. The supply or service reservoir 52 defines a supply/service chamber 64 for storing compressed air for supply to the vehicle braking system. The purge reservoir 54 defines a purge chamber 66 for storing compressed air for, as needed, purging the air dryer 20.

Figure 3:
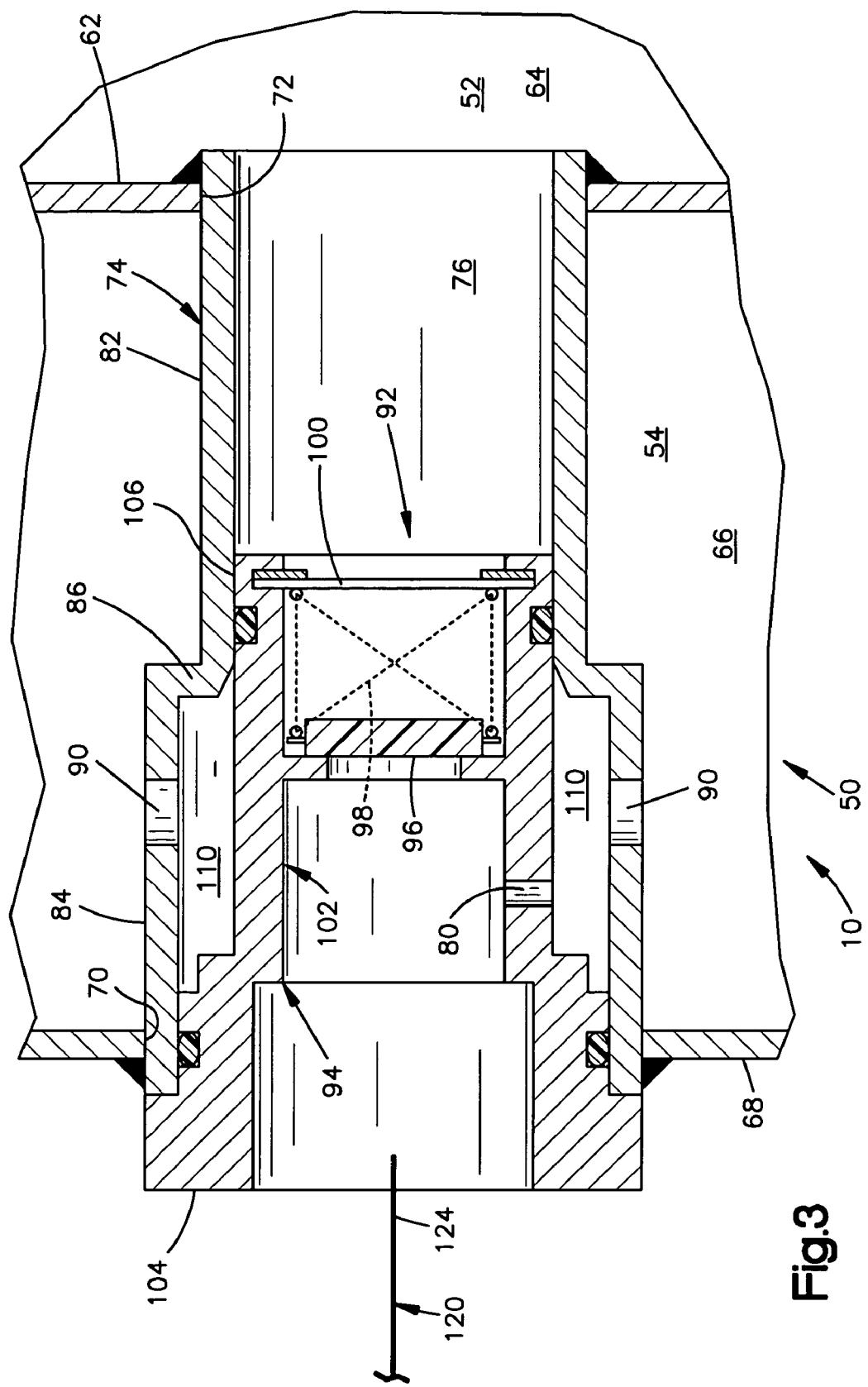
FIG. 3 is an enlarged view of a portion of the system of FIG. 1.

The purge reservoir 54 has an outer wall 68. An opening 70 (FIG. 3) is formed in the outer wall 68. Another opening 72 is formed in the baffle 62 between the supply/service chamber 64 and the purge chamber 66.

A passage member 74 extends between the opening 70 in the outer wall 68 of the purge reservoir 54, and the opening 72 in the baffle 62. The passage member 74 in the illustrated embodiment is a tubular member or tube having a passage 76 that connects the exterior of the reservoir assembly 50 in fluid communication with the supply/service chamber 64 and that also passes through the purge reservoir 52 and is in fluid communication with the purge chamber 66 through a purge passageway or purge orifice 80. The passage member 74 could take other forms, in other embodiments of the invention.

In the illustrated embodiment, the passage member 74 has a cylindrical first wall portion 82 extending outward from the baffle 62 and a cylindrical second wall portion 84 extending inward from the outer wall 68 of the purge reservoir 54. The first wall portion 82 is smaller in diameter than the second wall portion 84. An annular, radially extending shoulder portion 86 of the passage member 74 joins the first and second wall portions 82 and 84.

The second wall portion 84 of the passage member 74 has at least one purge flow opening 90. In the embodiment illustrated, the second wall portion 84 of the passage member 74 has a plurality of purge flow openings 90. The purge flow openings 90 extend between and establish fluid communication between the passage 76 and the purge chamber 66.

A delivery valve 92 is located in the passage 76 between the exterior of the reservoir assembly 50 and the supply or service chamber 64. In the illustrated embodiment, the delivery valve 92 is a delivery check valve that includes a housing 94, a movable valve member 96, a biasing member 98, and a perforated spring retainer 100.

The valve housing 94 has a tubular configuration including a generally cylindrical side wall 102. One end portion 104 of the side wall 102 is sealed to the second wall portion 84 of the passage member 74, and/or to the outer wall 68 of the purge reservoir 54, outward of the purge flow openings 90. This end portion 104 forms a port for connection with an air line 120, as described below. An inner end portion 106 of the side wall 102 is sealed to the first wall portion 82 of the passage member 74, inward of the purge flow openings 90.

As a result, an annular chamber or volume 110 is formed radially outward of the side wall 102 of the valve housing 94, and radially inward of the second wall portion 84 of the passage member 74. The annular chamber 110 is in fluid communication with the purge chamber 66 through the purge flow openings 90.

The purge passageway or purge orifice 80 is formed in the side wall 102 of the valve housing 94. The purge orifice 80 in the illustrated embodiment is a single, relatively small, opening that establishes fluid communication between the interior of the valve housing 94 and the annular chamber 110 and, thus, between the interior of the valve housing and the purge chamber 66. The purge orifice 80 is located between the check valve 92 and the air dryer 20. In other embodiment, the purge passageway or purge orifice could comprise more than one orifice or opening, so long as the flow rate through the purge passageway is at a desired low level.

The movable valve member 96 of the check valve 92 is located in the interior of the valve housing 94. The movable valve member 96 is biased into a closed position, as shown in FIG. 1, by the biasing member 98, which could be a spring. The biasing member 98 exerts a small amount of force, for example, one half pound resulting in a crack pressure of one pound per square inch.

The system 10 includes only one air line connecting the air dryer 20 and the reservoir assembly 50. The air line is shown schematically at 120. A first end portion 122 of the air line 120 is connected with the delivery port 44 of the base 26. A second end portion 124 of the air line 120 is connected with the delivery valve housing 94. As a result, the delivery port 44 and the interior of the valve housing 94 are in fluid communication with each other through the air line 120.

The flow arrows 130 in FIG. 1 represent the direction of air flow during the charging cycle. Control air flows out of the control port 32 to cause the purge valve 40 to assume a first, or supply, condition. Compressed air flows into the supply port 29 from the compressor 30.

The purge valve 40 directs the compressed air from the supply port 29 through the internal passage 42 into the inlet 27 of the desiccant cartridge 22. The air flows through the desiccant cartridge 22 and exits the air dryer through the outlet 28, then flows to the delivery port 44 through the internal passage 46 as indicated by the arrow 130. The air flows out of the base 26 through the one air line 120 to the delivery check valve 92.

One first portion of the air flowing through the one air line 120 flows into the delivery check valve 92, moves the movable valve member 96 to the open position, and flows through the valve into the supply/service chamber 64. This portion of the air fills the supply/service chamber 64.

Another portion of the air flowing through the one air line 120 flows through the purge orifice 80, into the annular chamber 110, and thence through the purge flow openings into the purge chamber. This other portion of air fills the purge chamber 66. The purge chamber 66 is filled at the same time as the supply/service chamber 64, to the same pressure. In some systems, or during subsequent charges, the purge volume may fill first, before the supply volume.

When the supply/service chamber 64 is filled to a predetermined pressure, the compressor 30 is turned off, and the check valve 92 closes. As the pressure in the supply/service chamber 64 thereafter decreases, because of brake usage, the compressor 30 can be turned on again to refill the supply/service chamber.

Figure 2:
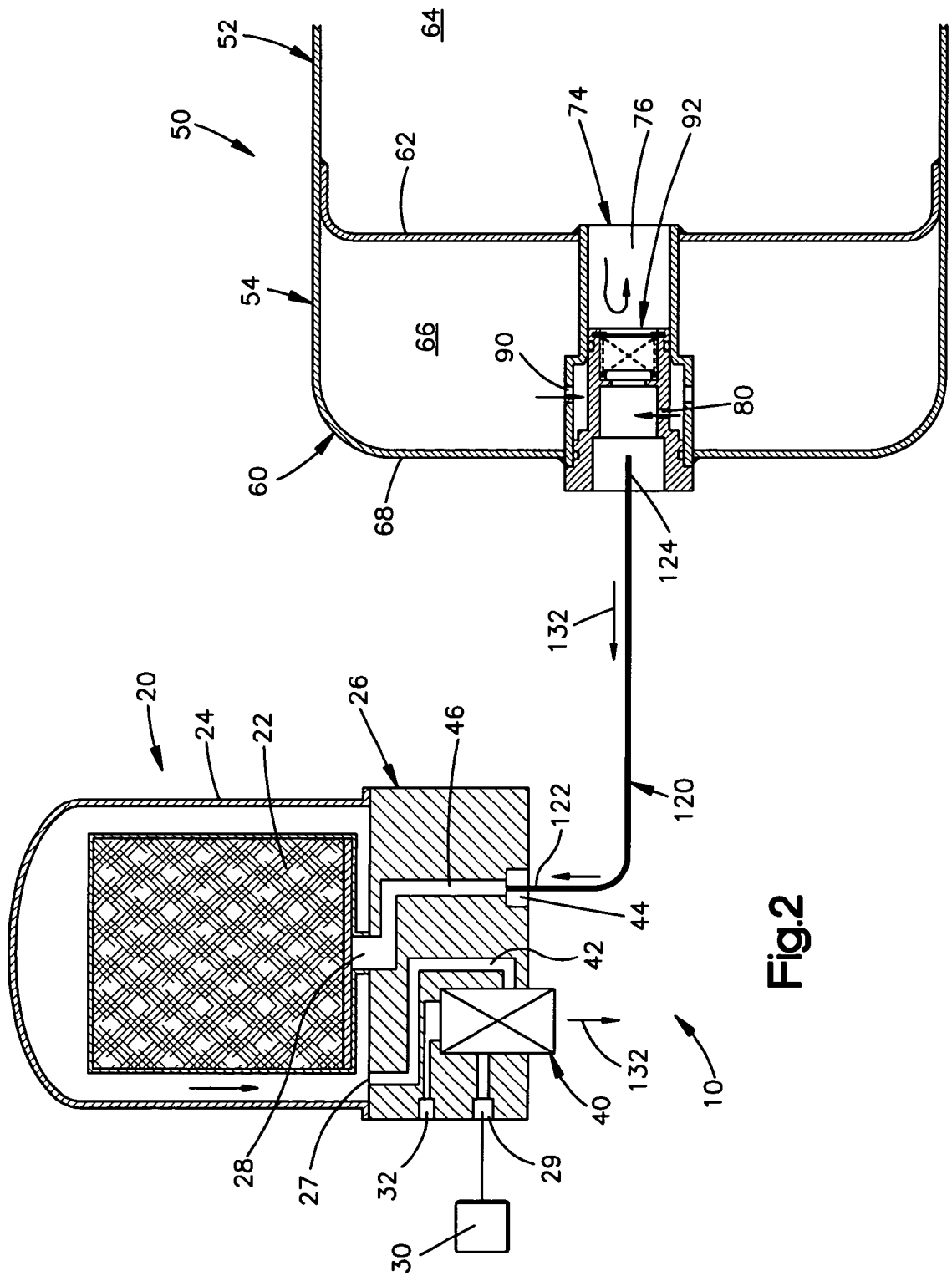
FIG. 2 is a view of the air supply system of FIG. 1 showing fluid flow directions during a purge cycle.

The arrows 132 in FIG. 2 represent the direction of air flow during the purge cycle. When the compressor 30 is turned off, control pressure at the control port causes the purge valve 40 to assume a second, or purge, condition. The supply port 29 is blocked. The purge valve 40 opens to establish a flow path out of the air dryer 20 to atmosphere.

Air can not flow out of the supply or service reservoir 52 into the air dryer 20, because the delivery check valve 92 is closed. Air can, however, flow out of the purge reservoir 54, because the delivery check valve 92 is not located between the purge orifice 80 and the air dryer 20.

As a result, air flows from the purge chamber 66, through the purge flow openings 90 and the annular chamber 110, and through the purge orifice 80, into the interior of the valve housing 94. The air from the purge reservoir 54 then flows into the air flow line 120. The very small size of the purge orifice 80 causes the pressure and flow rate of the air flowing out of the purge chamber 66 to decrease substantially as the air passes through the purge orifice.

This purge air flows through the one air flow line 120, in the direction indicated by the arrows 132, into the internal passage 46 in the base 26. The purge air then flows into the outlet 28 of the cartridge 22, through the desiccant cartridge 22, and out of the cartridge through the inlet 27. This backflow of low pressure, clean, air from the purge chamber 66 regenerates the desiccant cartridge 22. The air flowing out of the cartridge 22 flows through the internal passage 42 and out of the base 26 through the purge valve 40, to atmosphere or a drain (not shown).

Figure 4:
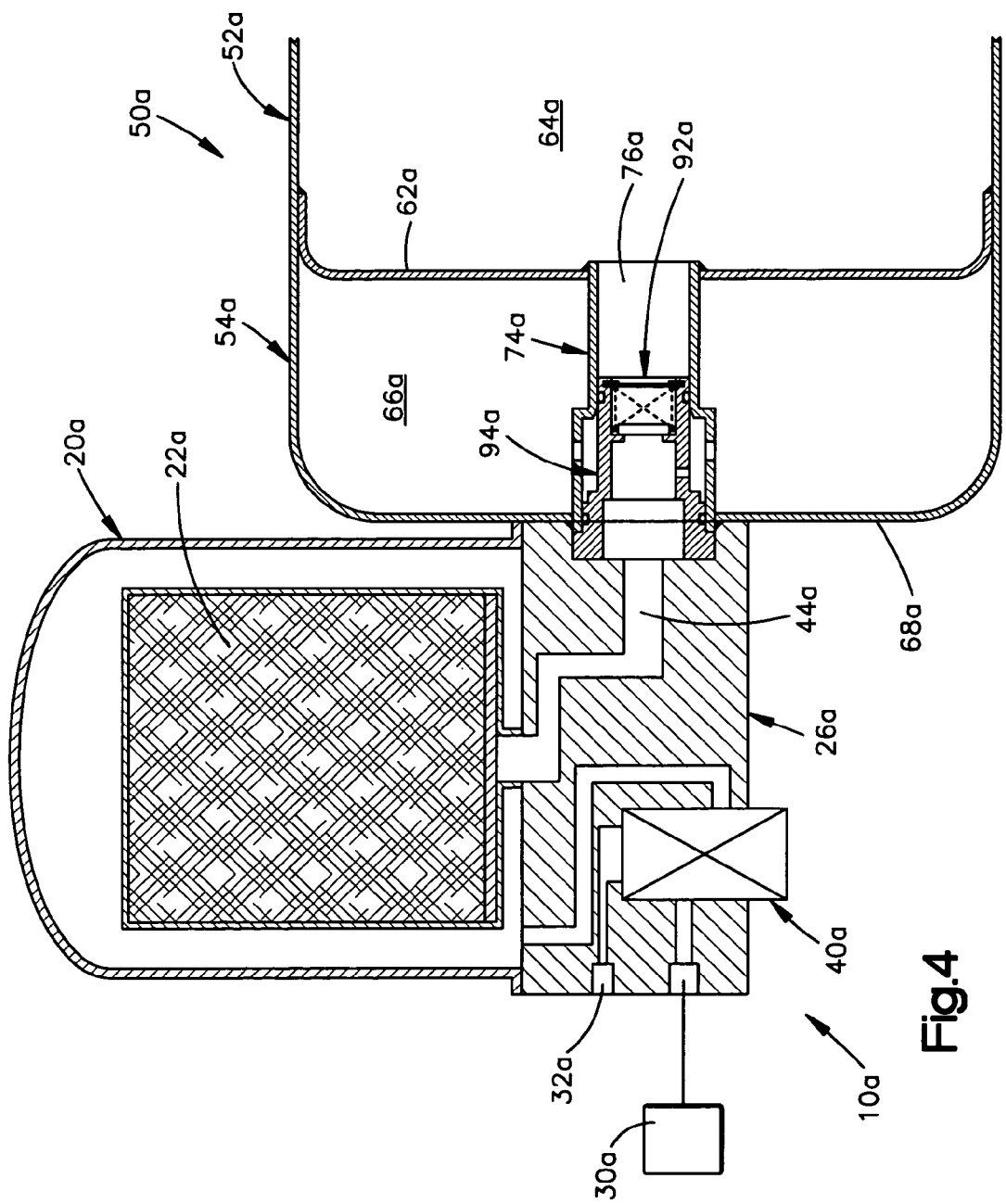
FIG. 4 is a schematic view similar to FIG. 1 of a vehicle air supply system constructed in accordance with a second embodiment of the invention.

FIG. 4 illustrates schematically a portion of an air supply system 10a constructed in accordance with a second embodiment of the invention. The air supply system 10a is similar to the air supply system 10 and parts shown in FIG. 4 that are the same as or similar to corresponding parts in the first embodiment are given the same reference numerals with the suffix "a" attached. The primary advantage of this embodiment is that it allows the use of a single pneumatic seal between the air dryer and the reservoir.

In the air supply system 10a, the reservoir assembly 50a is not remote from the air dryer 20a, but is connected directly, via a single pneumatic connection, with the base 26a of the air dryer. As illustrated, the outer wall 68a of the purge reservoir 54a, the delivery check valve 92a, and the passage member 74a are in abutting engagement with the base 26a of the air dryer 20a. Thus, the reservoir assembly 50a is mounted on the air dryer 20a.

The purge reservoir 54a is located between the supply or service reservoir 52a and the air dryer 20a. The passage 76a extends from the air dryer 20a through the outer wall 68a of the purge reservoir 54a and to the wall 62a of the supply or service reservoir 52a.

The delivery port 44a on the base 26a of the air dryer 20a opens directly into the central passage in the valve housing 94a. No air flow lines at all are needed between the air dryer 20a and the reservoir assembly 50a.

Figure 5:
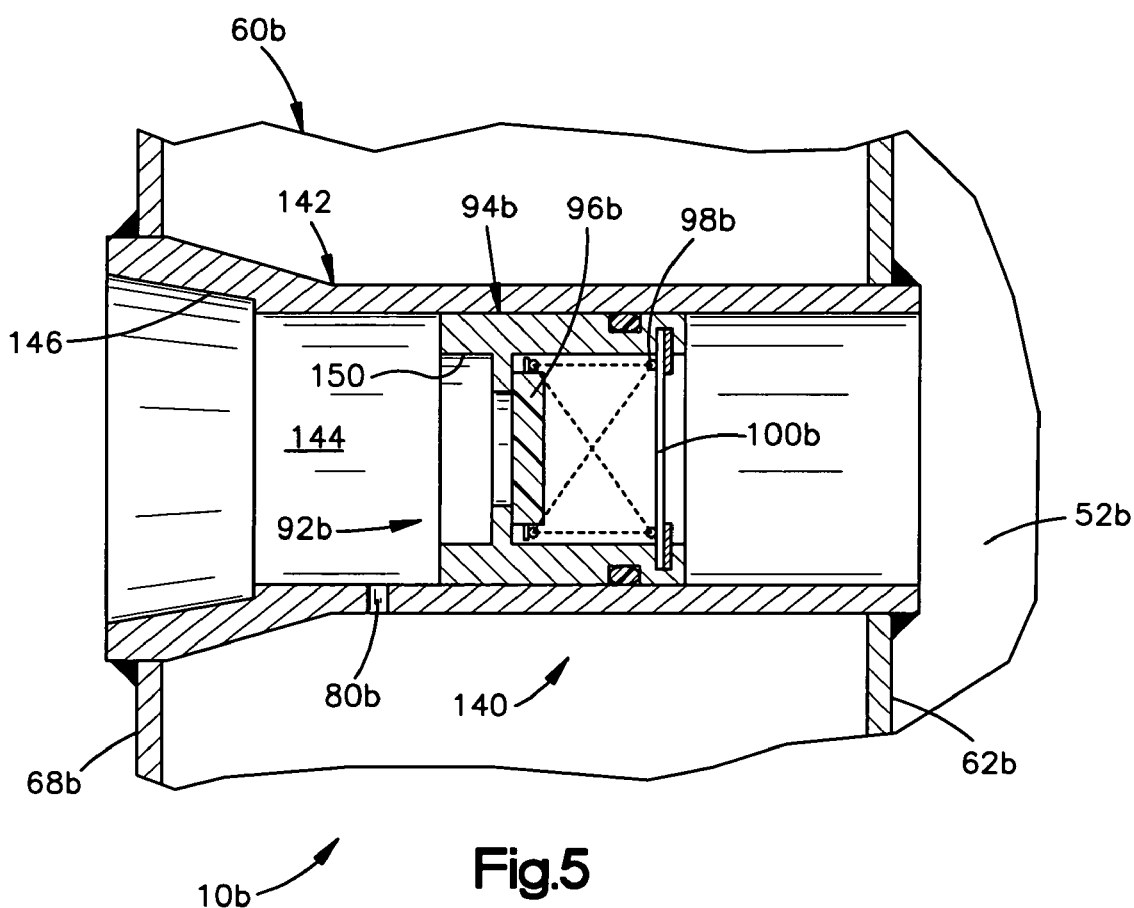
FIG. 5 is a view similar to FIG. 3 of a portion of an air supply system in accordance with a third embodiment of the invention.

FIG. 5 illustrates a delivery valve and purge orifice assembly 140 that is constructed in accordance with a third embodiment of the invention. The assembly 140 can be substituted in the air supply system 10 for the delivery valve 92 and purge orifice 90. Parts shown in FIG. 5 that are the same as or similar to corresponding parts in the first embodiment are given the same reference numerals with the suffix "b" attached.

The assembly 140 includes a body tube 142 that extends between the baffle 62b and the outer wall 68b of the purge reservoir 60b. The body tube 142 defines a single passage 144 that extends between the service or supply reservoir 52b and the exterior of the purge reservoir 60b. The body tube 142 can take the place of the combination of the valve housing 94 and passage member 74 shown in FIG. 3 The body tube 142 has an NPT port 146 for connection with the only one air line (not shown) that connects with the air dryer. The body tube 142 also has in it the purge orifice 80b.

A delivery valve 92b is located in the passage 144 in the body tube 142. The delivery valve 92b includes a valve housing 94b, a movable valve member 96b, a biasing member 98b, and a perforated spring retainer 100b. The valve housing 94b has a hex recess 150 for enabling installation and removal.

Figure 6:
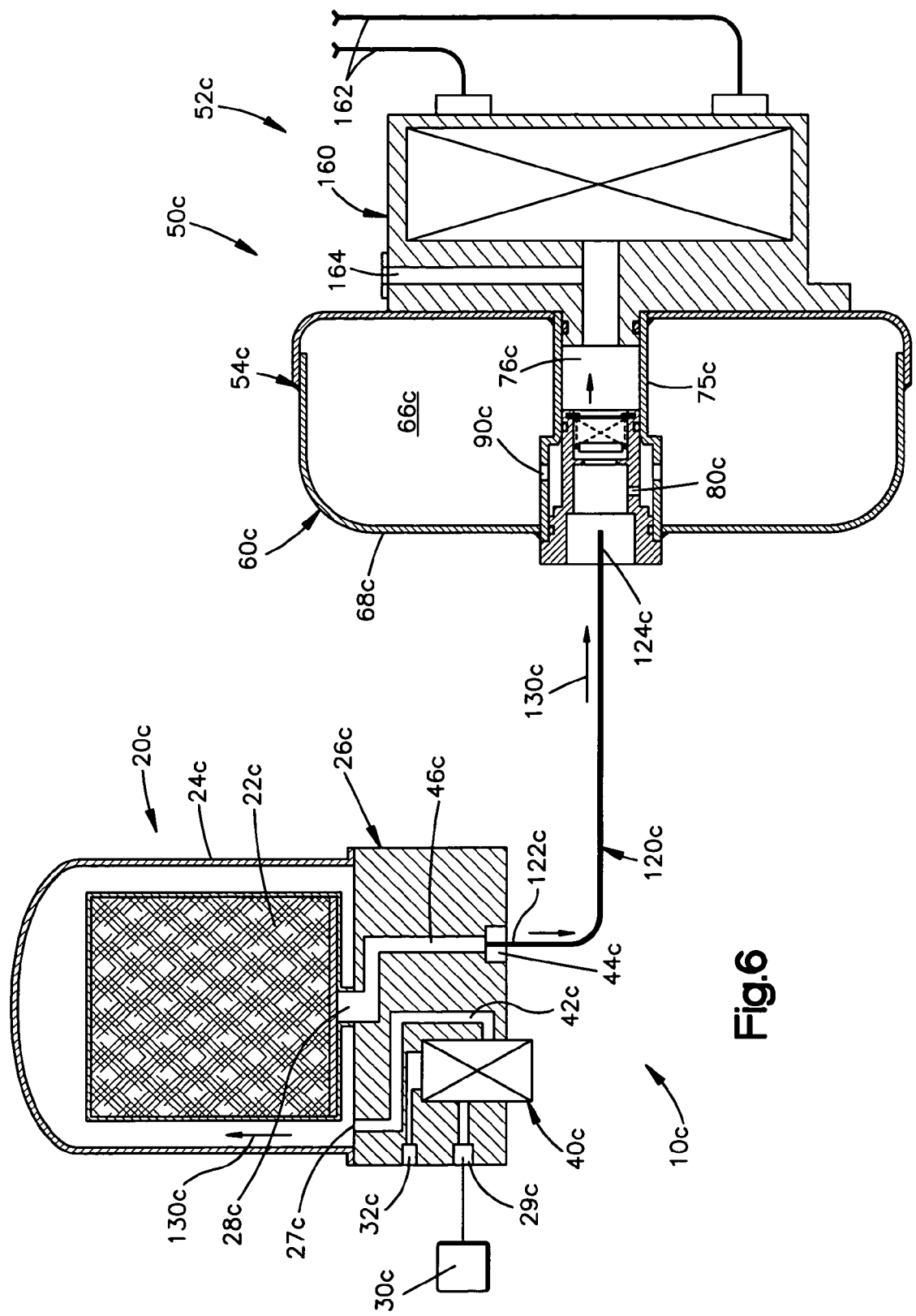
FIG. 6 is a view similar to FIG. 1 of a vehicle air supply system in accordance with a fourth embodiment of the invention.

FIG. 6 illustrates schematically a portion of an air supply system 10c constructed in accordance with a fourth second embodiment of the invention. The air supply system 10c is similar to the air supply system 10 and parts shown in FIG. 6 that are the same as or similar to corresponding parts in the first embodiment are given the same reference numerals with the suffix "c" attached.

In the system 10c, the downstream section 52c of the reservoir assembly 50c includes a multi circuit pressure protection valve 160. The pressure protection valve 160 is mounted on the back wall of the purge reservoir 54c.

The inlet of the pressure protection valve 160 is connected in fluid communication with the passage 76c in the passage member 75c. The outlet of the pressure protection valve 160 is connected with two fluid flow lines or hoses 162. Each one of the hoses 162 is connected with a respective reservoir (not shown), such as a primary reservoir, a secondary reservoir, or a reservoir for a park system or a trailer system. The pressure protection valve 160 is also connected through an ancillary outlet 164 with a governor (not shown) for the compressor of the system 10c.

The pressure protection valve 160 does not allow air to flow from its inlet to its outlet unless the air pressure is at least a predetermined amount. Therefore, should a leak develop in the system 10c, the pressure protection valve 160 can close to prevent air from being exhausted from the system. As a result, each one of the circuits including the hoses 162 is pressure protected.

Figure 7:
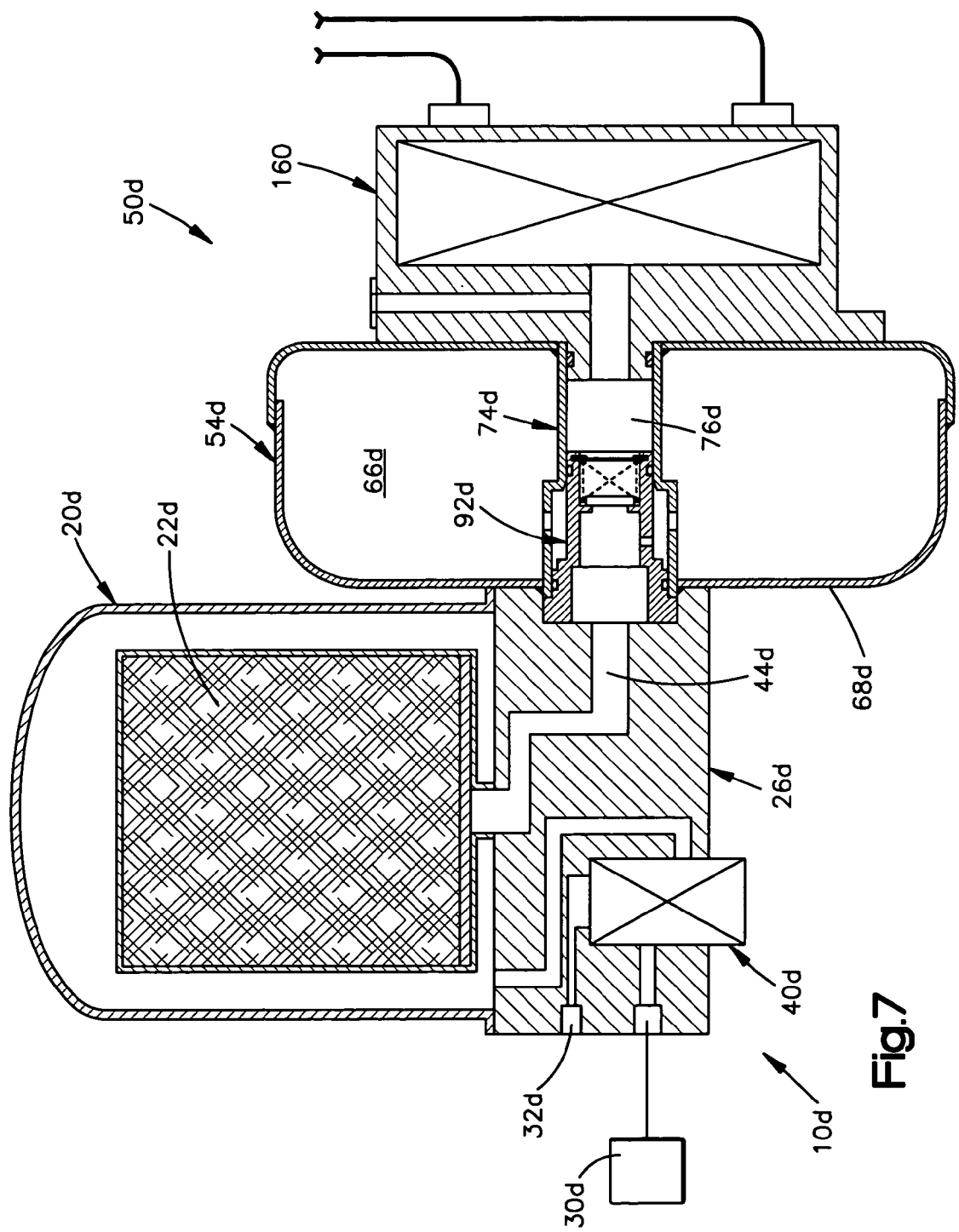
FIG. 7 is a view similar to FIG. 4 of a portion of an air supply system in accordance with a fifth of the invention.

FIG. 7 illustrates schematically a portion of an air supply system 10d constructed in accordance with a fifth embodiment of the invention. The air supply system 10d is similar to the air supply system 10 and parts shown in FIG. 7 that are the same as or similar to corresponding parts in the first embodiment are given the same reference numerals with the suffix "d" attached.

The air supply system 10d includes a reservoir assembly 50d that is similar to the reservoir assembly 50c of FIG. 6, that is, one including a purge reservoir 54d and a multi circuit pressure protection valve 160. In the air supply system 10d, the reservoir assembly 50d is not remote from the air dryer 20d, but is connected directly, via a single pneumatic connection, with the base 26d of the air dryer. As illustrated, the outer wall 68d of the purge reservoir 54d, the delivery check valve 92d, and the passage member 74d are in abutting engagement with the base 26d of the air dryer 20d. Thus, the reservoir assembly 50d is mounted on the air dryer 20d.

The purge reservoir 54d is located between the pressure protection valve 160 and the air dryer 20d. The passage 76d extends from the air dryer 20d through the outer wall 68d of the purge reservoir 54d and to the pressure protection valve 160.

The delivery port 44d on the base 26d of the air dryer 20d opens directly into the central passage in the valve housing 94d. No air flow lines at all are needed between the air dryer 20d and the reservoir assembly 50d.

From the above description of the invention, those skilled in the art will perceive improvements, changes, and modifications in the invention. Such improvements, changes, and modifications within the skill of the art are intended to be included within the scope of the appended claims.

Having described the invention, I claim:

1. A reservoir for an air supply system for a vehicle air braking system, said reservoir comprising:
    a plurality of wall portions defining a supply or service chamber and a purge chamber in said reservoir;
    a passage member defining a passage extending through said purge chamber, a first end of said passage member defining a port in a first wall portion, included in the plurality of wall portions, for establishing fluid communication between said reservoir and the air supply system and a second end of said passage member defining an opening in a second wall portion, included in the plurality of wall portions;
    a delivery valve in said passage; and
    a purge passageway in said passage member between said delivery valve and said port providing fluid communication between said air supply system and said purge chamber, whereby said passage member provides fluid communication to both of said purge chamber and said supply or service chamber.

2. A reservoir as set forth in claim 1 wherein said delivery valve is a delivery check valve.

3. A reservoir as set forth in claim 1 wherein said port is adapted for connection with an air line for establishing fluid communication with a source of compressed air for said reservoir, said port and said air line also being adapted for delivering purge air from said purge chamber through said purge passageway and said port.

4. A reservoir as set forth in claim 1 further including only one air line connecting said port with the air supply system for delivering compressed air to said reservoir and for delivering purge air from said reservoir.

5. A reservoir assembly for an air supply system for a vehicle air braking system including an air dryer, said reservoir assembly comprising:
    a downstream reservoir section and a purge reservoir;
    a passage member forming a passage extending through the interior of said purge reservoir between a port at a first end of the passage member for fluid communication to said air dryer and an opening in a second end of the passage member for fluid communication to said downstream reservoir section, the passage being in fluid communication with said air dryer and said downstream section;
    a delivery valve in said passage; and
    a purge passageway in said passage member between said port in fluid communication with said air dryer and said delivery valve, said purge passageway providing fluid communication through said passage member to said purge reservoir, whereby the passage member provides fluid communication to both of said purge reservoir and said downstream reservoir section.

6. A reservoir assembly as set forth in claim 5 wherein said downstream section and said purge reservoir are in a single tank with a wall separating said downstream section from said purge reservoir.

7. A reservoir assembly as set forth in claim 5 wherein said purge passageway is located on said delivery valve.

8. A reservoir assembly as set forth in claim 5 wherein said passage member supports a movable valve member that forms part of said delivery valve.

9. A reservoir assembly as set forth in claim 5 wherein said passage member is a tube.

10. A reservoir assembly as set forth in claim 5 wherein said purge passageway comprises a plurality of openings formed in said passage member.

11. A reservoir assembly as set forth in claim 5 wherein said purge passageway is formed in a housing of said delivery valve, said housing being supported on said passage member, said passage member having at least one purge flow opening in fluid communication with said purge chamber.

12. A reservoir assembly as set forth in claim 11 wherein said passage member and said housing define an annular volume between said purge chamber and said passage, said purge passageway extending between said passage and said annular volume, said purge flow opening extending between said passage and said annular volume.

* * * * *